United States Patent [19]
Byles

[11] 3,872,987
[45] Mar. 25, 1975

[54] GRAPPLE ARRANGEMENT FOR VEHICLE
[76] Inventor: Clauriste H. Byles, Hwy. 171 North, Many, La. 71449
[22] Filed: Jan. 23, 1974
[21] Appl. No.: 435,805

[52] U.S. Cl............................ 214/147 G, 214/620
[51] Int. Cl............................................. B66c 3/00
[58] Field of Search........... 214/147 G, 147 R, 620

[56] References Cited
UNITED STATES PATENTS
2,685,974   8/1954   Kern .............................. 214/147 G
3,456,822   7/1969   Smith ............................. 214/147 G Primary Examiner—Albert J. Makay
Assistant Examiner—George F. Abraham
Attorney, Agent, or Firm—Jack W. Hayden

[57] ABSTRACT

A grapple arrangement for mounting on a vehicle includes a generally U-shaped main frame member for positioning on the rear axle of a vehicle with a pair of elongated booms pivotally supported on the frame for vertical movement. Swivel means are carried adjacent the other end of the booms with grapple means thereon, and means are associated with the grapple means to effect rotation of the grapples as may be desired. Means are secured to the frame and to the booms for effecting vertical movement of the booms.

10 Claims, 4 Drawing Figures

GRAPPLE ARRANGEMENT FOR VEHICLE

SUMMARY OF THE INVENTION

Various dvices have been proposed for mounting on a vehicle including a vertically movable boom arrangement and rotatable grapples for engaging logs and the like. The patents with which applicant is familiar include the U.S. Pats. to C. L. Smith, et al No. 3,456,822; Kern, No. 2,685,974 and McLean, No. 2,778,514.

The present invention provides a relatively simple arrangement so that it may be removably supported on the rear axle of a vehicle such as a tractor or the like. It includes a generally U-shaped main frame member having a pair of elongated booms pivotally secured thereto. Swivel means are carried adjacent the outer end of each of the booms and grapple means are pivotally supported by the swivel means and there are means associated with the swivel means to effect rotation of the grapple means as well as means connected between the main frame and the booms to effect raising and lowering of the booms as may be desired. Lever means are positioned adjacent the operator's seat on the vehicle to enable the grapple means to be swiveled or rotated without requiring the operator to turn completely around during such operation.

Another object of the present invention is to provide a grapple arrangement for mounting on a vehicle including a generally U-shaped main frame member with elongated boom means pivotally supported thereon for vertical movement and swivel means supported by the boom means with grapple means connected to the swivel for engaging objects such as logs, and means including lever means positioned adjacent the operator's seat of the vehicle for rotation of the swivel means and connected grapple means.

Still another object of the present invention is to provide a grapple arrangement which can be quickly and readily positioned on the axle of a vehicle such as a tractor including a generally U-shaped main frame means which frame means includes boom means pivotally connected to the frame means for vertical movement relative thereto, swivel means supported by the boom means and grapple means mounted on the swivel means and means mounted on the frame means and boom means for rotation of the swivel means and associated grapple means including lever means adjacent the operator's seat for operation of such swivel means.

Still another object of the present invention is to provide a grapple arrangement which can be quickly and readily positioned on the axle of a vehicle such as a tractor including a generally U-shaped main frame means which frame means includes boom means pivotally connected to the frame means for vertical movement relative thereto, swivel means supported by the boom means and grapple means mounted on the swivel means and means mounted on the frame means and boom means for rotation of the swivel means and means mounted on said frame and connected to the boom for effecting vertical movement thereof.

Still another object of the present invention is to privde a grapple arrangement which can be quickly and readily positioned on the axle of a vehicle such as a tractor including a generally U-shaped main frame means which frame means includes boom means pivotally connected to the frame means for vertical movement relative thereto, swivel means supported by the boom means and grapple means mounted on the swivel means and means mounted on the frame means and boom means for rotation of the swivel means and means mounted on said frame and connected to the boom for effecting vertical movement thereof, said last named means including a double acting hydraulic cylinder with piston means therein and a piston rod connected to the piston means and pivotally connected to the boom means so that application of hydraulic fluid to the cylinder raises and lowers the boom means.

Other objects and advantages of the present invention will become readily apparent from a consideration of the following description and drawings herein.

DESCRIPTION OF THE PREFERRED EMBODIMENT

Figure 1:
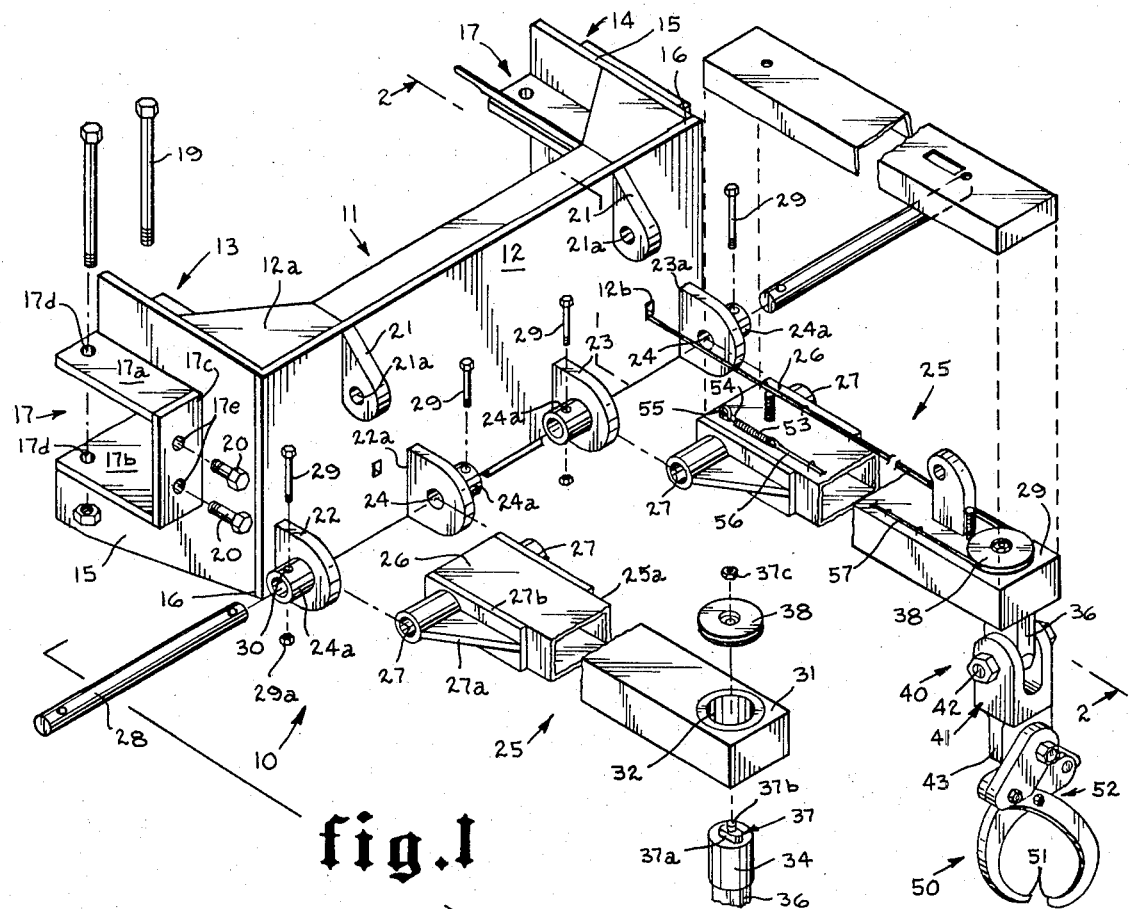
FIG. 1 is an exploded view illustrating certain components of the present invention.

Attention is first directed to FIG. 1 of the drawings wherein the preferred embodiment of the present invention is referred to generally by the numberal 10 and is shown as including a generally U-shaped main frame member referred to at 11 having elongated boom means referred to generally at 25 supported thereon, said boom means having swivel means referred to generally at 40 supported on the boom means with grapple means referred to generally at 50 carried by the swivel means.

Figure 2:
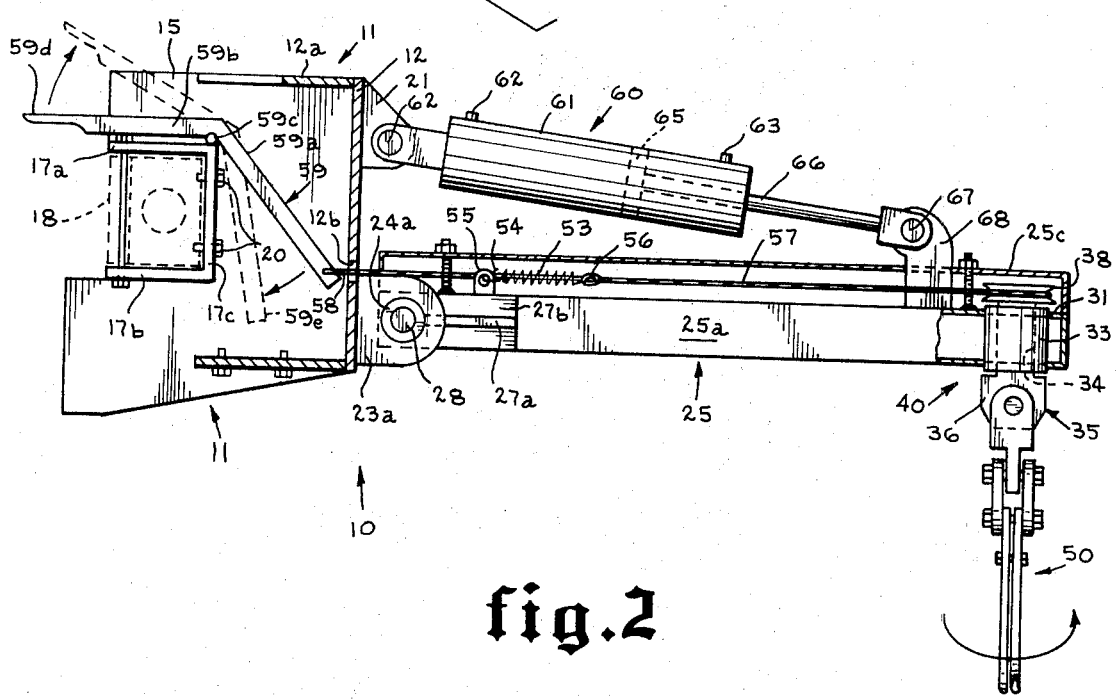
FIG. 2 is a sectional view on the line 2—2 of FIG. 1.
Figure 3:
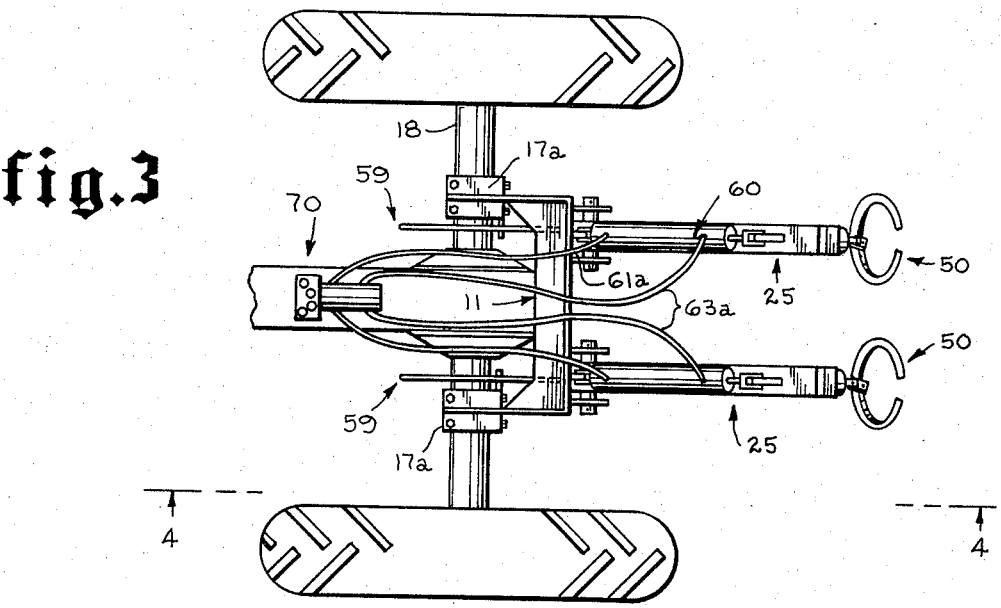
FIG. 3 is a plan view of FIG. 4.

Means referred to generally at 60 in FIG. 2 are provided for raising and lowering the elongated boom means 25.

The generally U-shaped main frame member includes a base 12 fabricated of suitable plate material with legs referred to generally at 13 and 14 extending therefrom in the same direction substantially parallel to each other. Suitable reinforcing and bracing 12a connect the legs 13 and 14 with the base 12, and the generally U-shaped frame member 11 and its components may be formed in any suitable manner and connected together such as by welding and the like.

The leg 13 as well as the leg 14 includes the member 15 which is secured, such as by welding or the like at its end 16 to the base 12 as shown in FIG. 1.

Each member 15 includes a generally U-shaped member referred to generally at 17 and including the plate member 17a and 17b forming the legs of the U-shaped member 17 in each leg 13 and 14 with the plate 17c forming the base of the U. The plates 17a, 17b and 17c are each secured to the respective members 17 of each leg 13 and 14 by suitable means such as welding or the like, and this arrangement enables the generally U-shaped frame member 11 and the grapple arrangement supported thereby to be carried on the axle housing of a vehicle as represented at dotted line 18 of FIG. 2. Suitable bolt means as illustrated at 19 are provided for fitting through the openings 17d in the plate member 17a and 17b after the generally U-shaped frame member has been positioned on the axle housing 18 as shown in FIG. 2 of the drawings to aid in securing and retaining the generally U-shaped frame member in position on such axle housing. In addition bolt means 20 are adapted to be engaged through openings 17e of the base 17c and through the housing portion of the vehicle axle to further aid in maintaining the generally U-shaped main frame member 11 in position on the vehicle axle.

As illustrated, the generally U-shaped main frame member 11 is arranged for supporting a piar of elongated boom means 25; however, only one boom or additional booms may be positioned on the main frame member 11 if desired.

Bracket means 21 are secured to the base 12 by suitable means such as welding or the like and are each provided with an opening 21a for purposes as will be described.

Similarly, bracket means 22 and 22a are arranged in spaced relation to each other as are bracket means 23 and 23a, such bracket means having openings 24 therein and sockets 24a for purposes as will be described.

The boom means 25 may be of any suitable configuration, and as illustrated is shown as being fabricated to provide a hollow rectangular box 25a of desired longitudinal extent. One end 26 of each boom means 25 is provided with the sockets 27 secured on each side of the box like configuration 25a by any suitable means such as the bracing 27a and 27b. *The hollow sockets 27 are of suitable extent to fit snugly between the brackets 22 and 22a* and the brackets 23 and 23a respectively and when positioned therein, the pin means 28 may be inserted through the sockets 24a and the sockets 27 to pivotally mount the elongated boom means 25 on the brackets 22, 22a and 23, 23a respectively.

After the pin 28 has been inserted in position in the sockets 24a and 27, suitable retaining means such as the bolt 29 may be secured through the opening 30 and the nut 29a engaged with such bolt to retain the pivot pin 28 in position engaged with the boom means 25 and its respecgive support bracket.

The other end 31 of the boom means 25 includes an opening 32 which is suitably arranged to provide a bearing housing for the swivel means referred to generally at 40. The opening 32 forms part of the swivel means and a suitable bearing means 33 may be positioned therein, such hollow bearing means 33 being adapted to receive the round portion 34 of the spindle means referred to generally at 35. Such spindle means includes the non-circular portion 36 which extends from one end of the circular portion 34 while the other end 34a of the circular portion includes a seat means referred to generally at 37 for the pulley 38. Such seat means 37 includes the non-circular projection 37a with the threaded shaft means 37b extending therefrom, the non-circular portion 37a fitting within a non-circular opening formed in the pulley means 38. An opening in the pulley enables a nut 37c to be engaged with the threaded shaft 37b to secure the pulley means to the spindle means 35 so that such pulley means is secured to and rotates with the spindle means 35. The portion 36 of the spindle means 35 is provided with an opening to enable the grapple means 50 to be carried pivotally by the swivel means 40.

Such grapple means 50 includes the bracket 41 which is connected by the nut and bolt 42 to the portion 36 of the spindle means 35 and such bracket 42 includes a depending portion 43 for pivotally connecting with the tongs which form the grapple means 50.

The tongs 50 include terminal barbs 51 at their lower ends and suitable means referred to generally by the numeral 52 at their upper ends for pivotally carrying the tongs 50 on the portion 43 of the bracket 41.

The configuration of the tongs 50 is well known as is their manner of pivotally connecting by the means 52 to the link 53 to accommodate opening and closing of such tongs relative to each other for grasping an object when it is desired and disengaging therefrom when it is desired.

Suitable means are associated with the swivel means 40 to effect rotation thereof, such means including the spring means 53 which is secured at one end 54 to the bracket 55 carried on each of the boom means 25. The other end of the spring means 56 is connected to a cable means 57 which cable is wound around the pulley and extends through an opening 12b in the base 12 of the generally U-shaped frame member 11 and is connected at its end 58 to the lever means referred to generally at 59. Such lever means includes the portion 59a with the portion 59b arranged at an angle thereto and pivotally mounted at 59c to the U-shaped members 17 in each leg 13 and 14. When the handle portion 59d of the lever 59 is grasped manually and pulled upwardly as illustrated by the arrow in FIG. 2, this pivots the portion 59a to the dotted line position shown at 59e and thereby causes the cable 57 to rotate the pulley 38 and connected spindle means 35 along with the grapple means 50 pivotally carried thereby.

When the handle portion 59 is released, the tension in spring 53 returns the grapple to its normal position.

Suitable means referred to at 60 are provided for elevating and lowering each of the boom means 25, such means 60 being shown as in the form of a double acting hydraulic cylinder 61 with suitable openings 62 and 63 for connection with a hydraulic hose to supply fluid to either end of the cylinder means 61. It will be noted that the cylinder means 61 is pivotally mounted at 62 on the bracket means 21 and includes a piston means 65 therein with the piston rod 66 being secured to the piston means 65 and pivotally connected at 67 to the bracket 68 carried on the boom means 25.

Thus, when hydraulic fluid is supplied to the opening 62, the piston means 65 is forced in the cylinder 60 so as to lower the boom means 25, and when hydraulic fluid is supplied through the opening 63 the boom means 25 will be elevated.

Figure 4:
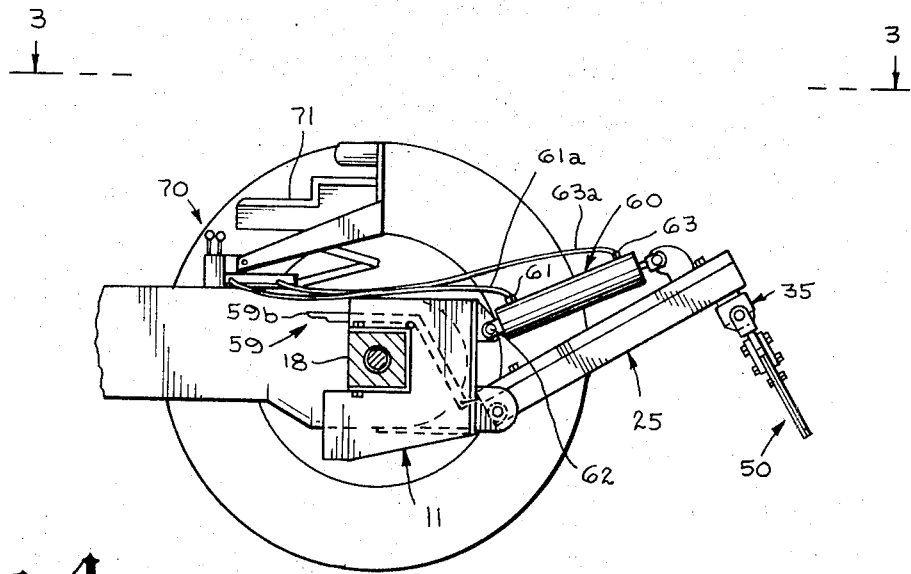
FIG. 4 is a sectional view with one wheel removed to better illustrate the positioning of the frame on the vehicle axle.

While it is believed that the operation of the invention is apparent from the foregoing description, attention is now directed to FIG. 4 of the drawings wherein it can be seen that the generally U-shaped support member 11 is mounted on the rear axle housing of a vehicle, which for purposes of illustration is shown as being a tractor. Suitable hydraulic conduits 61a and 63a are connected to a source of hydraulic fluid carried by the vehicle and to the openings 61 and 63 respectively.

Suitable controls as shown at 70 are provided for operating the means 60 to effect vertical movement of the boom means 25 in a manner as desired.

Particular attention is directed to the arrangement of the lever means 59 and its relationship to the operator's seat illustrated at 71 in FIG. 4. In that the handle portion 59d terminates immediately adjacent the operator's seat 71 so that the operator may actuate the swivel means 40 merely by lowering his hand along side the seat 71. Each year a number of people are killed when tractors overturn, and prior art devices of the present type include means that require the operator to turn substantially all the way around, or assume an awkward position in the operator's seat 71 to operate the swivel means 40 which can be dangerous.

The present invention overcomes this in that the lever means 59 along with the arrangement for effecting rotation of the swivel means does not require the operator to assume an awkward position in the seat 71.

When it is desired to engage a log or other object by the apparatus of the present invention the vehicle is moved to the vicinity of the log or object, and the means 60 actuated to lower the boom means 25. The grapple means 50 comprising the tongs 50 upon engaging a log will open and the lower ends 51 thereof will move around and grasp such log when the boom means 25 is elevated. The vehicle may then be moved to enable the log to be moved to a desired position.

When it is desired to disengage the log, the boom means 25 is lowered so that the tongs 50 engage the log at their upper portion so as to cause the tongs to spread apart whereupon the vehicle may be moved away from the log. The spreading apart of the tongs is accomplished in a manner well known in the art so that such is apparent to those skilled in the art.

The foregoing disclosure and description of the invention are illustrative and explanatory thereof, and various changes in the size, shape, and materials as well as in the details of the illustrated construction may be made without departing from the spirit of the invention.

What is claimed is:

1. A grapple arrangement for mounting on a vehicle axle comprising:
   a. a generally U-shaped main frame for positioning on the rear axle of the vehicle;
   b. an elongated boom pivotally supported at one end on said frame for vertical movement;
   c. swivel means carried adjacent the other end of said boom;
   d. grapple means carried by said swivel means;
   e. means associated with said swivel means to effect rotation of said grapple means connected to said swivel means, said means including:
      1. a pulley connected to said swivel means for rotation;
      2. spring means secured to said boom;
      3. cable means having one end secured to said spring means, said cable means extending about said pulley;
      4. lever means pivotally mounted on said frame-member having one end secured to the other end of said cable means whereby movement of said lever means effects rotation of said pulley and grapple means; and
   f. means mounted on said frame and connected to said boom for effecting vertical movement of said boom.

2. The invention of claim 1 wherein said generally U-shaped main frame member comprises a base member with two legs projecting therefrom in the same direction, said legs each having a generally U-shaped member carried thereby for receiving the rear axle of a vehicle.

3. The invention of claim 2 including bolt means for engaging the generally U-shaped members carried by said legs to removable position said main frame on the vehicle axle.

4. The invention of claim 1 wherein said grapple means comprises tongs having terminal barbs at their lower ends and means at the upper end of said tongs for pivotally securing said tongs to said swivel means.

5. The invention of claim 1 wherein said swivel means includes an opening in said boom, spindle means for rotatably fitting in said opening, said spindle means including seat means for said pulley.

6. The invention of claim 5 wherein said seat means comprises a non-circular projection for engaging with a non-circular opening in said pulley, threaded shaft means extending from said non-circular projection to receive a nut thereon and thereby secure pulley to said spindle.

7. The invention of claim 6 including bearing means for the opening in said boom, said spindle means having shoulder means thereon for engaging against one end of said bearing means.

8. The invention of claim 1 wherein said means to affect vertical movement of said boom includes a double acting cylinder pivotally secured to said main frame; piston means in said cylinder with a piston rod secured thereto and extending from said cylinder and pivotally secured to said boom, whereby hydraulic fluid supplied to said cylinder moves said boom vertically.

9. The invention of claim 1 wherein the vehicle is provided with an operator's seat and wherein said lever means is adjacent the operator's seat to enable said lever means to be grasped for rotation of said grapple means without requiring the operator to turn around to operate said lever means.

10. The invention of claim 1 wherein said main frame supports a pair of elongated booms.

* * * * *